G. W. H. KREY.
Egg-Opener.

No. 207,426.  Patented Aug. 27, 1878.

WITNESSES:
C. Neveux
C. Sedgwick

INVENTOR:
G. W. H. Krey
BY Munn & Co
ATTORNEYS.

UNITED STATES PATENT OFFICE.

GEORGE W. H. KREY, OF BROOKLYN, E. D., NEW YORK.

IMPROVEMENT IN EGG-OPENERS.

Specification forming part of Letters Patent No. 207,426, dated August 27, 1878; application filed June 14, 1878.

*To all whom it may concern:*

Figure 1:
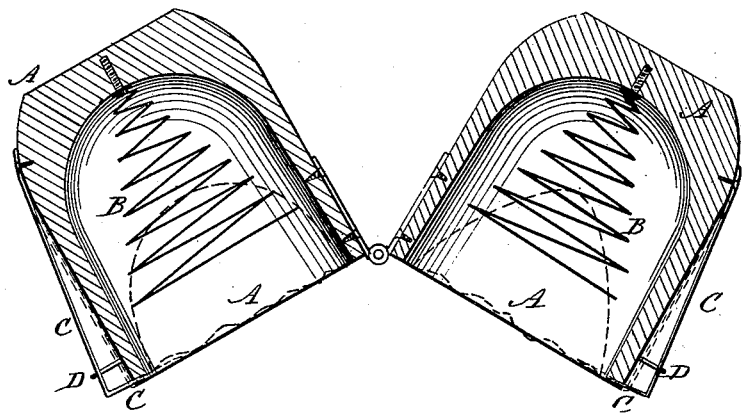
Figure 2:
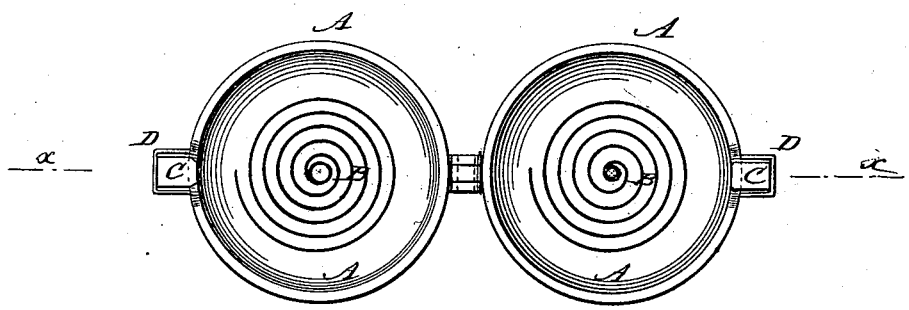

Be it known that I, GEORGE W. H. KREY, of Brooklyn, E. D., in the county of Kings and State of New York, have invented a new and useful Improvement in Egg-Openers, of which the following is a specification:

Figure 1 is a longitudinal section of my improved device, taken through the line $xx$, Fig. 2, and shown in position for discharging the contents of an egg. Fig. 2 is a face view of the device when opened to insert an egg.

Similar letters of reference indicate corresponding parts.

The object of this invention is to furnish a device for holding an egg, breaking its shell, and emptying out its contents, which shall be so constructed as to enable the operation to be quickly and neatly performed, and without any danger of soiling the hands, and which at the same time shall be simple in construction and convenient in use.

The invention consists in the combination of the two cup-shaped parts, hinged to each other, the two conical spiral springs, and the two flat springs, having their forward ends made sharp and bent inward at right angles with each other, as hereinafter fully described.

The body of the device is made in the form of two cup-shaped parts or halves, A, which are hinged to each other, as shown in Figs. 1 and 2, so that the edges of their open ends may close against and fit upon each other.

In the bottom of the cavity of each part A is secured the apex of a conical spiral spring, B, which springs are designed to receive and hold the ends of the egg to be operated upon, and the elasticity of which enables the device to be used with eggs of different sizes.

To the sides of the parts A opposite their hinge are attached the flat springs C, the forward parts of which pass through keepers D attached to the said parts A. The forward or free ends of the springs C are bent inward at right angles, rest in notches in the edges of the parts A, so as to be close together when the device is closed, and are made sharp, so as to readily penetrate the egg-shell.

In using the device, it is opened, the egg is placed endwise within one of the springs B, and the device is closed. The springs C are then pressed inward, causing their edges to penetrate the egg-shell. The device is then held with the springs C downward, and is opened with the said springs C still pressed inward.

The operation of opening the device divides the egg-shell, and its contents flow out into the receiving-vessel, the inwardly-projecting ends of the springs C retaining the shell in the device. The springs C are then released, the shell drops out, and the device is ready to receive another egg.

Having thus described my invention, I claim as new and desire to secure by Letters Patent—

The combination of the two cup-shaped parts A, hinged to each other, the two conical spiral springs B, and the two springs C, having their forward ends made sharp and bent inward at right angles with each other, substantially as herein shown and described.

GEORGE W. H. KREY.

Witnesses:
　JAMES T. GRAHAM,
　C. SEDGWICK.